No. 645,069. Patented Mar. 13, 1900.
G. CHRISTENSEN.
AUTOMATIC CUT-OFF.
(Application filed Dec. 30, 1899.)
(No Model.)

Witnesses
Severance.
E. V. Byng.

Inventor
Godfrey Christensen
by
Mason Fenwick Lawrence
his Attorney

THE NORRIS PETERS CO., PHOTO-LITHO., WASHINGTON, D. C.

UNITED STATES PATENT OFFICE.

GODFREY CHRISTENSEN, OF HAMPTON, NEBRASKA.

AUTOMATIC CUT-OFF.

SPECIFICATION forming part of Letters Patent No. 645,069, dated March 13, 1900.

Application filed December 30, 1899. Serial No. 742,164. (No model.)

*To all whom it may concern:*

Be it known that I, GODFREY CHRISTENSEN, a citizen of the United States, residing at Hampton, in the county of Hamilton and State of Nebraska, have invented certain new and useful Improvements in Automatic Cut-Offs; and I do hereby declare the following to be a full, clear, and exact description of the invention, such as will enable others skilled in the art to which it appertains to make and use the same.

My invention relates to improvements in automatic cut-offs for watering tanks or troughs; and it consists in certain novel constructions, combinations, and arrangements of parts, as will be hereinafter fully described and specifically claimed.

The object of my invention is the production of a cut-off for watering troughs and tanks which will be automatic in its operation and which when the water lowers to a certain extent the cock will be automatically opened and more water supplied to the tank, so as to raise the level of the same and when a certain height is reached the cock will be automatically closed and the supply of water cut off.

Figure 1:
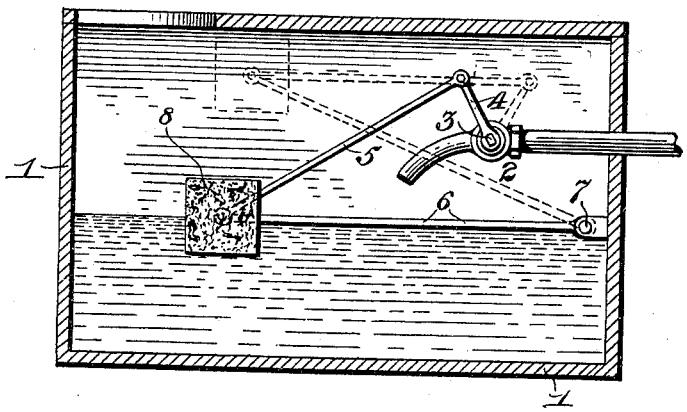
Figure 2:
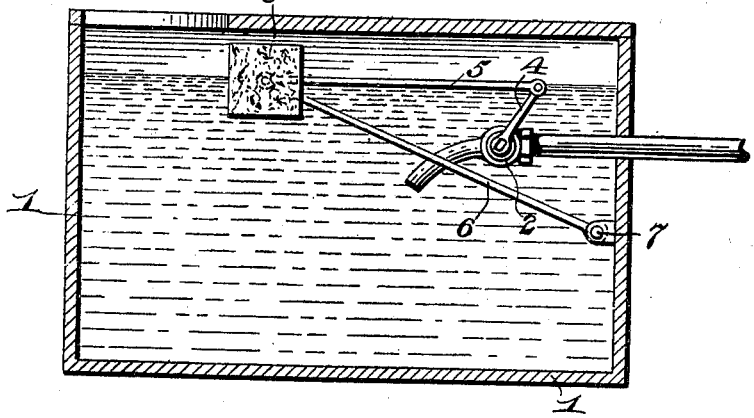
Figure 3:
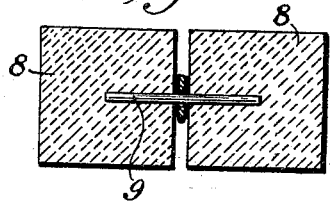

In the accompanying drawings, Figure 1 is a vertical sectional view through a trough, showing my improved cut-off in position within the same, the closed or cut-off position of the cock being shown in dotted lines. Fig. 2 is a similar section showing the cock and the position of the parts as they appear when the cock is in an open position; and Fig. 3 is a vertical sectional view through the float and showing the manner of securing the pivoted rods to the same.

1 in the drawings represents an ordinary trough or tank particularly designed for watering stock, which trough is provided with a suitable cock or faucet 2, having a rotary valve 3, which latter is formed with an upwardly-extending rapidly-moving arm 4, to the upper end of which arm is pivoted a rod 5, which rod inclines downwardly, and to the lower end of which is pivoted an approximately horizontally arranged rod 6, which latter is pivoted at its inner end to the trough or tank, as at 7. The arm 4 is arranged substantially at right angles to the rod 5, so that a uniform range of movement and power would be secured for opening or closing the valve 3, and by this construction and arrangement the greatest leverage possible is obtained for operating the said valve. The inner end of the lower rod 6 being pivotally fixed to the tank and the inner end of the upper rod 5 being pivotally fixed to the upper end of the arm 4, said lower arm being connected with the valve 3. It is obvious that upon the lower end of the rod 6 being raised the rod 5 and the arm 4, connected therewith, will be forced rearwardly, which will operate the valve to cut off the supply of water to the tank, and upon the outer end of the lower rod 6 descending the upper rod 5, which is connected thereto, will be drawn forwardly and downwardly and the upper end of the arm 4 drawn forward, which action will operate the valve connected therewith to permit water to pass by the valve through the faucet into the tank or trough. To facilitate the operation of the valve and to render the movement thereof automatic, I provide a float 8 at the connection of the outer end of the upper rod 5 with the outer end of the lower rod 6, which float is preferably constructed of two pieces of cork which are connected by a short rod 9, also passing through the connection, uniting the upper rod 5 and the lower rod 6.

By the construction set forth it will be apparent that I have invented a very simple arrangement for automatically regulating the supply of water to stock tanks and troughs and one which will be very perfect in its operation and not liable to get out of order and that I have produced a construction that will be very sensitive to the action of the water in rising or lowering to close or open the valve.

The tank is preferably provided with a suitable cover having an opening through which stock drink, by the use of which cover the water is more or less protected from dust, impurities, and from the atmosphere.

Having now described my invention, what I claim as new, and desire to secure by Letters Patent, is—

1. The combination with a stock tank or trough, of a faucet or cock arranged to deliver water thereto, a rotary valve in said faucet for controlling the flow of water, said valve being provided with an upwardly-extending arm, a rod connected to the upper end of said arm and extending downwardly within the tank, another rod pivoted at its inner end to the tank and at its outer end to the outer end of the upper rod, and a float applied to the two rods, whereby, upon the water rising in the tank, the lower or outer end of the upper rod will be raised, and said rod and the arm connected thereto, and the valve will be forced backward and the outer end of the lower rod will be raised and the flow of water will be cut off, and, upon the water in the tank lowering, the reverse movements of the parts will be made, and the water will be supplied to the tank, substantially as described.

2. The combination with a stock tank or trough, of a faucet or cock arranged to deliver water thereto, a rotary valve in said faucet for controlling the flow of water, said valve being provided with an upwardly-extending arm, a rod connected to the upper end of said arm, the said arm being so arranged that it will be practically at a right angle to said rod in its various movements, a lower rod connected at its inner end to the tank and at its outer end to the lower end of the upper rod, and a float applied to the meeting ends of the upper and lower rods by means of a short rod passing through the float and through the connections of the rods, substantially as described.

In testimony whereof I hereunto affix my signature in presence of two witnesses.

GODFREY CHRISTENSEN.

Witnesses:
BERT MACKEN,
JAMES A. WILSON.